(12) United States Patent
Harada et al.

(10) Patent No.: US 7,021,220 B2
(45) Date of Patent: Apr. 4, 2006

(54) RAILWAY VEHICLE AND METHOD FOR OPERATING VEHICLE

(75) Inventors: Iwao Harada, Mito (JP); Masakazu Matsumoto, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/795,337

(22) Filed: Mar. 9, 2004

(65) Prior Publication Data

US 2005/0139115 A1    Jun. 30, 2005

(30) Foreign Application Priority Data

| Dec. 25, 2003 | (JP) | ............................. 2003-430693 |
| Jan. 16, 2004 | (JP) | ............................. 2004-009647 |
| Feb. 3, 2004 | (JP) | ............................. 2004-026301 |

(51) Int. Cl.
*B61D 17/00* (2006.01)

(52) U.S. Cl. ........................... 105/1.1; 105/1.2; 105/65

(58) Field of Classification Search ................ 105/1.1, 105/1.2, 1.3, 63, 64.1, 65, 64.2, 66, 72.2; 296/181.5
See application file for complete search history.

(56) References Cited

U.S. PATENT DOCUMENTS

| 1,648,505 A | * | 11/1927 | Persu ..................... 296/181.5 |
| 2,195,599 A | * | 4/1940 | Ragsdale et al. ............. 105/1.2 |
| 5,009,169 A | * | 4/1991 | Viens ........................ 105/4.1 |
| 5,289,778 A | * | 3/1994 | Romine .................... 104/88.04 |
| 5,647,793 A | | 7/1997 | Mariaux et al. |

FOREIGN PATENT DOCUMENTS

| EP | 0 337 377 | 10/1989 |
| EP | 0 722 872 | 7/1996 |
| JP | 05 270402 | 10/1993 |
| JP | 08-198105 | 8/1996 |

OTHER PUBLICATIONS

"Effect of Shape of Train Nose on Compression Wave Generated by Train Entering Tunnel" by Maeda, et al. pp 315-319, no date.

* cited by examiner

*Primary Examiner*—Mark T. Le
(74) *Attorney, Agent, or Firm*—Antonelli, Terry, Stout and Kraus, LLP.

(57) ABSTRACT

A railway vehicle includes an air intake 6 provided at a nose portion of a leading vehicle 1, an air tank (reservoir) 9 for storing intake air, and an air outlet 11, by which air is sucked in (breathed in) during entry of the leading vehicle to a tunnel and discharged within the tunnel, so as to reduce the pressure generated at the nose portion and to cut down micropressure waves. When the nose of the leading vehicle 1 enters a tunnel 3, an intake control valve 8 of the air reservoir, depressurized to below atmospheric pressure (1 atm), opens to take in air through an air inlet 6 via a path 7 into the air reservoir 9. When the whole leading vehicle enters the tunnel, the intake control valve 8 closes, and air is discharged through the outlet 11 via a pump 10.

15 Claims, 11 Drawing Sheets

RAILWAY VEHICLE AND METHOD FOR OPERATING VEHICLE

The present application claims priority from Japanese patent application JP2003-430693 filed on Dec. 25, 2003, Japanese patent application JP2004-9647 filed on Jan. 16, 2004, and Japanese patent application JP2004-26301 filed on Feb. 3, 2004, the contents of which are hereby incorporated by reference into this application.

FIELD OF THE INVENTION

The present invention relates to a railway vehicle that runs on tracks having tunnels.

DESCRIPTION OF THE RELATED ART

Regarding the latest shinkansen trains (bullet trains), the maximum running speed is around 270 km/h to 300 km/h, and is determined to reach 350 km/h in the future. As the speed of the train increases, the shape of the car bodies and the flow of air are associated more closely with each other, and their influence on the environment is classified largely into the following two cases.

The first is the case where the railway vehicle travels in a broad space such as when it runs in an environment referred to as a "free-field" having no tunnels. In this case, there is no need to consider the environmental influence caused by tunnels. Therefore, in the first case, environmental problems can be solved by appropriately designing the nose shape of the car body to reduce the air resistance when the vehicle is running at high speed.

The second is the case where the railway vehicle travels through a narrow and limited space such as a tunnel. In this case, the leading vehicle serves as a piston in the tunnel, and this relationship between the leading vehicle and the tunnel can cause a serious environmental problem. That is, the air around the leading vehicle entering the tunnel is compressed between the leading vehicle and the tunnel, generating weak compression waves that are so-called micropressure waves that propagate at the speed of sound faster than the running vehicle inside the tunnel. A portion of the micropressure waves are reflected at the tunnel exit, but a major portion thereof are discharged as low-frequency sound from the tunnel exit. The influence is, as described, extreme on the environment when the railway vehicle enters a tunnel at high speed.

Therefore, it is a very important task to design the nose shape of the railway vehicle body so as to minimize the emission of micropressure waves from the tunnel, in order to reduce the influence of the railway vehicle running at high speed on the environment. Patent reference 1 discloses a known nose shape of a railway vehicle that solves this problem. According to the disclosure, the nose shape of the railway vehicle is designed so that plural axi-symmetric noses such as paraboloids of revolution each having a constant rate of change of cross section are formed in multiple steps, according to which the generation of micropressure waves can be reduced. For example, if the nose shape adopts a three-step cross-sectional rate change, the cross-sectional rate change can be increased at the front end portion and at the rear portion that have little influence on the micropressure waves, while the cross-sectional rate change can be reduced at the intermediate portion that has a great influence on the micropressure waves. According to such construction, the micropressure waves can be reduced with a short nose length.

Moreover, non-patent reference 1 discloses another art of reducing the micropressure waves. Non-patent reference 1 discloses a nose shape of a linear motor car, wherein a front end portion having a basic geometric shape, such as a spheroid, is cut off. Unlike the shinkansen trains that are run on wheels, the linear motor cars are run on superconducting magnets, so perpendicular walls formed by arraying foundation stones, which are so-called guide ways, are disposed on both sides of the car body. The truck portion of the car is positioned in confronting relation to a roadbed at a close distance where the magnetic force is active, so the whole car body travels at high speed surrounded by the guide ways and the roadbed. Thus, the nose shape of the leading vehicle of the linear motor car is inevitably influenced by the guide ways, and the nose shape is designed to correspond to the guide ways.

Patent reference 1: Japanese Patent No. 2912178. Non-patent reference 1: Tatsuo Maeda et al., "Effect of Shape of Train Nose on Compression Wave generated by Train Entering Tunnel" (International Conference on Speedup Technology for Railway and MAGLEV Vehicles, 1993, Yokohama, Japan).

In a railway vehicle running on tracks having tunnels, if the railway vehicle is to travel at a speed as high as 350 km/h or even higher, the nose shape of the leading vehicle is optimized to reduce the generation of micropressure waves in the tunnel. In practice, it is effective to reduce the cross-sectional area of the nose portion of the leading vehicle (the cross-sectional area of the railway vehicle body perpendicular to the longitudinal direction of the car), but this causes the length of the nose portion to be elongated. However, this diminishes the cabin space, and thus, the maximum number of passengers on the railway vehicle is reduced. Therefore, it is necessary to suppress the reduction of the number of passengers on the leading vehicle as much as possible, but at the same time, reduce the generation of micropressure waves in the tunnel caused by railway vehicles traveling at high speed. The prior art methods were only able to partially solve the contradicting tasks of reducing micropressure waves and ensuring the capacity of passengers on the leading vehicle.

SUMMARY OF THE INVENTION

The railway vehicle according to the present invention solves the problems of the prior art by providing an air inlet for taking in air on the surface of the car body at a nose portion of a leading vehicle, an air outlet for discharging the taken-in air disposed rearwards in the direction of travel from the nose portion, and an air intake tank that communicates the air inlet and the air outlet. In some cases, tunnel portal hoods are formed to the tunnel, but in the present specification, the term "tunnel" includes the portal hoods.

Furthermore, according to a method for operating a railway vehicle of the present invention, the railway vehicle comprises a mechanism to take in and discharge air, and an automatic train control system controls the railway vehicle to take in air when entering a tunnel and to discharge the intake air after a predetermined time has passed.

Thus, the present invention enables to reduce the micropressure waves generated in a tunnel by taking in air through inlets formed to the surface of the nose portion of the leading vehicle.

DETAILED DESCRIPTION OF THE PREFERRED EMBODIMENT

Now, the preferred embodiments of the present invention will be described in detail with reference to the drawings.

Figure 1:
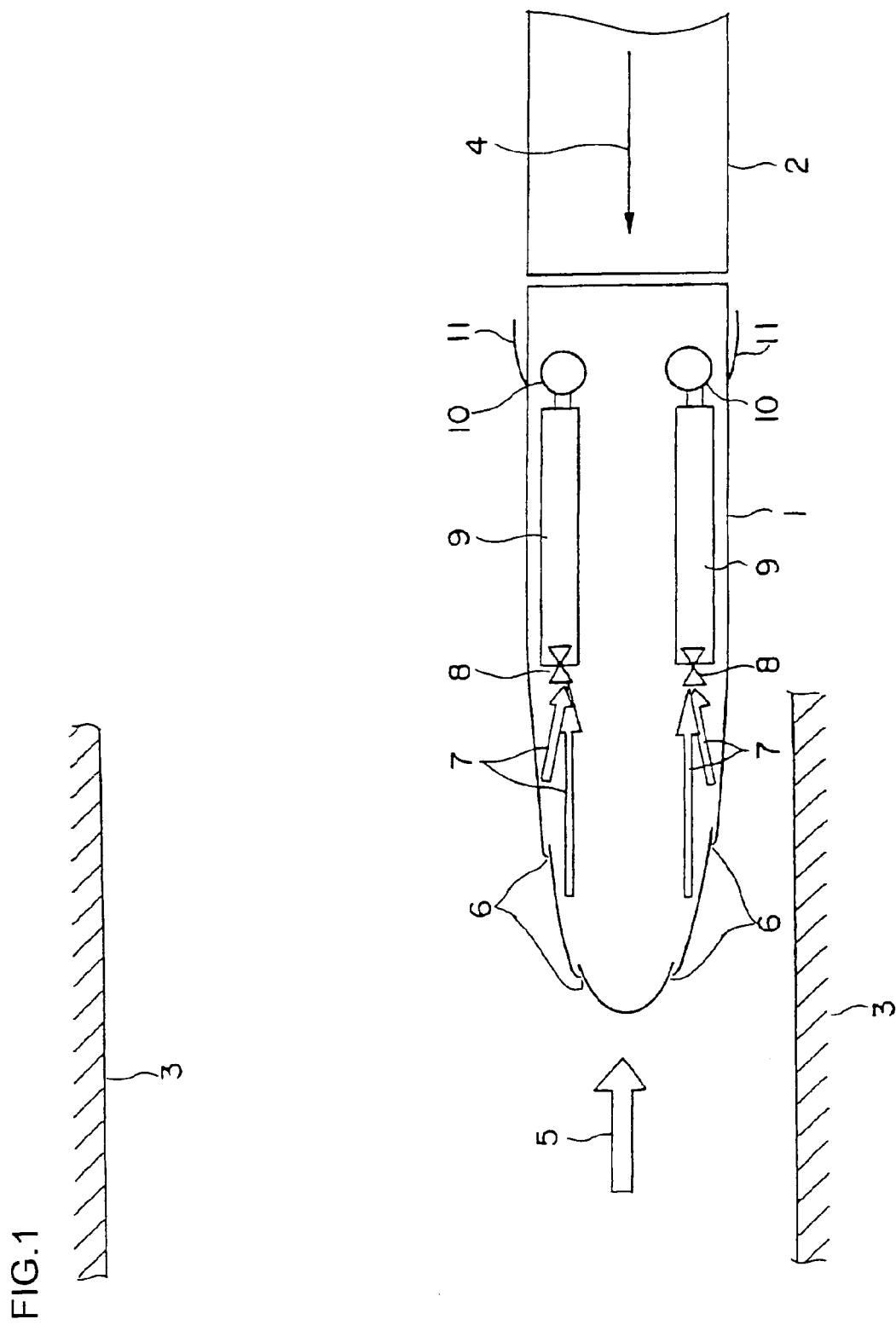
FIG. 1 is a plan view illustrating embodiment 1 of a railway vehicle according to the present invention.
Figure 2:
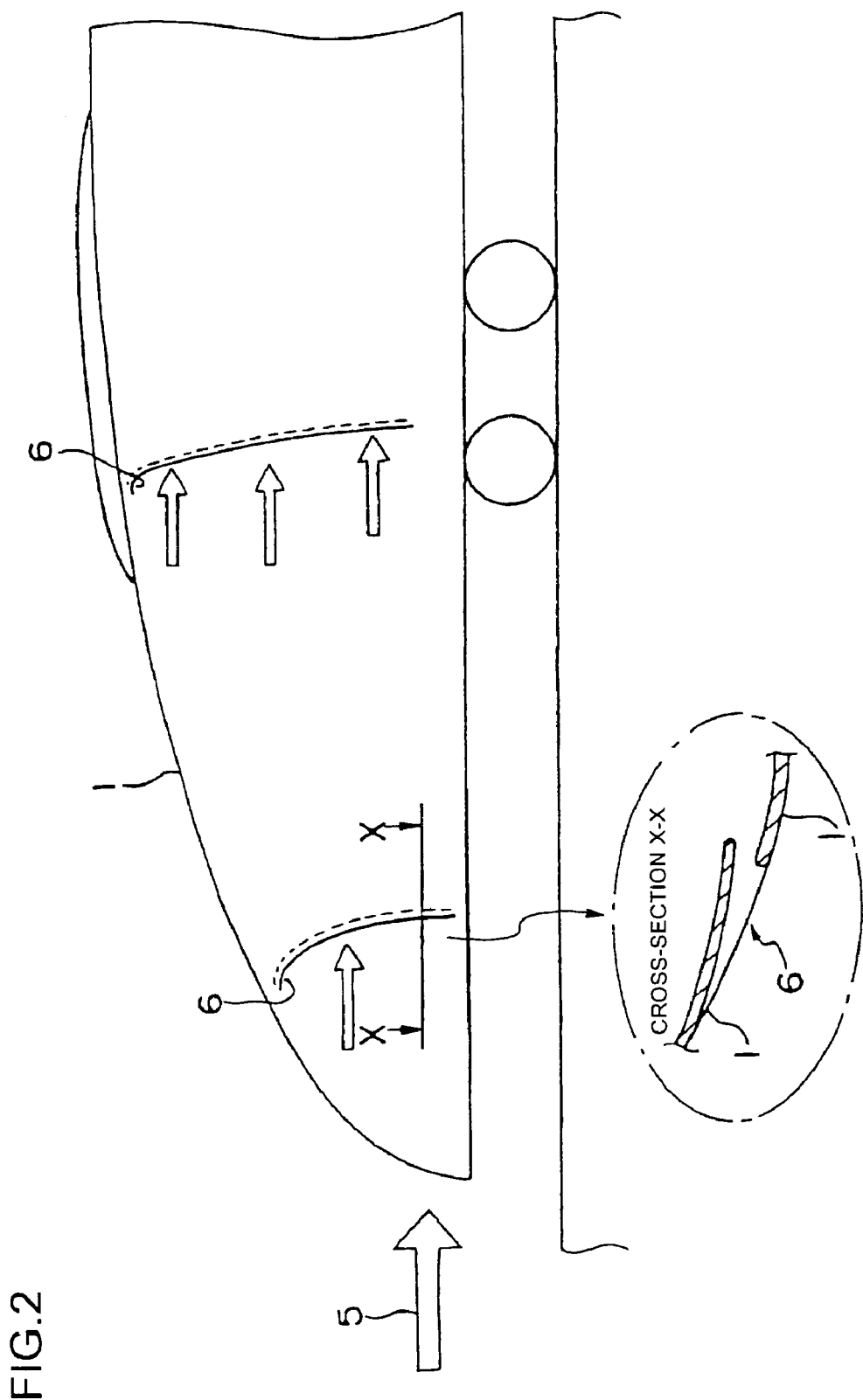
FIG. 2 is a side view of a leading vehicle of FIG. 1.

Embodiment 1:

FIG. 1 is a plan view showing a portion of a vehicle formation including a leading vehicle according to embodiment 1 of the present invention, and FIG. 2 is an explanatory side view thereof. In FIG. 1, an intermediate vehicle 2 is connected to a leading vehicle 1. The vehicle formation composed of the leading vehicle 1, the intermediate vehicle(s) 2 and a leading vehicle 1 on the other end is about to enter a tunnel 3. Arrow 4 indicates the direction of travel of the vehicle. Arrow 5 indicates the direction of air flow that occurs relatively with respect to the traveling vehicle. An air inlet 6 for taking in air is formed on the surface of a nose portion of the leading vehicle 1. According to the present embodiment, air inlets 6 are disposed at two locations on both sides of the nose portion, respectively. Each of the air inlets 6 is respectively connected to an air flow path 7. In the drawing, the air flow paths 7 are shown by arrows. Reference number 9 denotes air reservoirs (air intake tanks) for storing the air taken in via the air inlets 6 and air flow paths 7. Between the air flow paths 7 and the air reservoirs 9 are respectively disposed an intake control valve (air intake valve) 8. Air outlets 11 for discharging the air stored in each air reservoir 9, respectively, are disposed at locations excluding the nose portion of the leading vehicle, or in other words, excluding the area where the cross-sectional area of the car body is increased gradually from the nose portion. Pumps 10 are disposed to discharge the air through air outlets 11. Each pump 10 sucks out the air stored in the air reservoir 9 and discharges the same through the air outlet 11 to the exterior of the car body. The air outlet 11 is disposed at an underside of an under frame of the leading vehicle, and designed so that the air is discharged toward the tracks. The discharge timing of the air outlet 11 is determined to be either inside the tunnel or after passing the tunnel. If the discharge is performed inside the tunnel, it should desirably be performed gradually so as not to cause generation of micropressure waves.

It is possible to form the air outlets 11 on an end plate of the leading vehicle or the intermediate vehicle. According to such arrangement, noise caused by the discharged air or the exposure of the air outlet portion to running air can be prevented.

We will describe a case in which a vehicle formation running on tracks is about to enter a tunnel. First, each air reservoir 9 in the leading vehicle 1 is depressurized to a pressure lower than atmospheric pressure (1 atm), hereafter negative pressure, through the pump 10 for discharging air. As the leading vehicle 1 enters the tunnel 3 (as described later, just prior to entering the tunnel), the intake control valve 8 disposed on the air intake side of each depressurized air reservoir 9 is opened, and air is sucked in through the air inlets 6 via the air flow path 7 into the air reservoir. Air is continuously taken in through the air inlets 6 until the inner pressure of the reservoir 9 reaches equilibrium with the air pressure at the air inlets 6. Thus, air is filled in the air reservoir 9. Next, when the whole body of the leading vehicle 1 enters the tunnel 3, the intake control valve 8 is closed, and the air filled in each air reservoir 9 is discharged through the air outlet 11 to the exterior of the car body via the pump 10. The pump 10 is continuously operated so as to depressurize the air reservoir 9 to negative pressure, and thereafter, the pump 10 is stopped.

The reason for depressurizing the air reservoir 9 to negative pressure is to enable the air reservoir to take in sufficient amount of air when the leading vehicle 1 enters a next tunnel. The timing for stopping the pump 10 is determined by detecting the inner pressure of the air reservoir 9.

Figure 3:
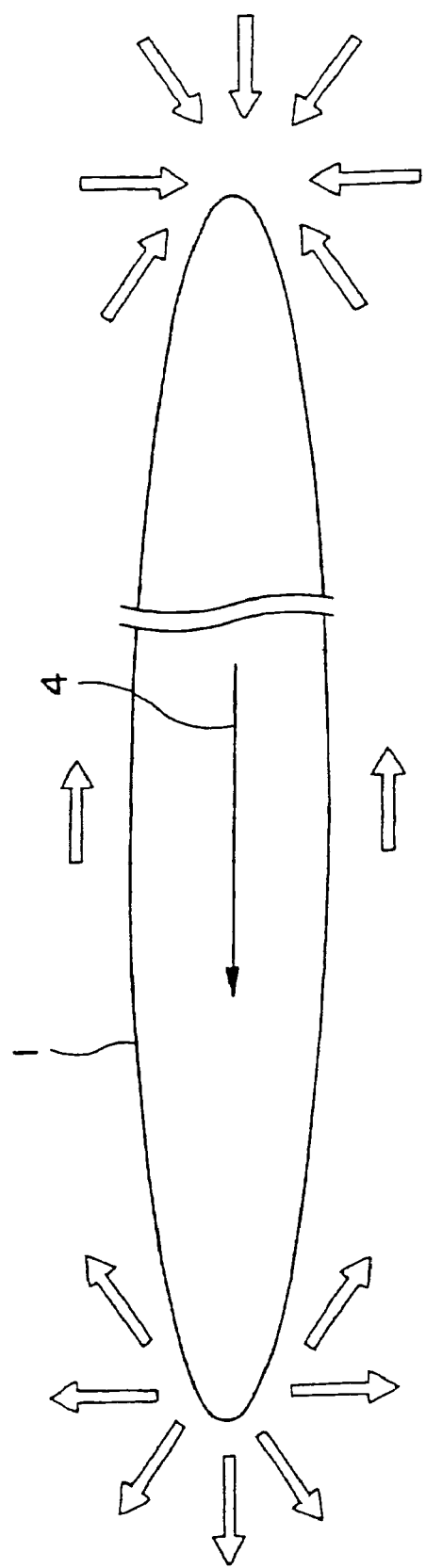
FIG. 3 is a frame format of the air flow formed around a car body of a vehicle formation composed of a leading vehicle, a intermediate vehicle and a rear vehicle.

Next, the mechanism for reducing the micropressure waves will be explained. FIG. 3 is a schematic diagram of the air flow created around the vehicle formation composed of a leading vehicle, an intermediate vehicle and a rear vehicle. The leading vehicle runs while displacing a static air volume equivalent to a product of the traveled distance and the cross-sectional area (projected cross-section perpendicular to the direction of travel). On the other hand, the amount of air equivalent to the product of the traveled distance and the cross-sectional area flows into the tail portion of the rear vehicle. The amount of air flowing into the tail portion of the rear vehicle is compensated by the air being displaced by the leading vehicle. Since the intermediate vehicle has the same cross-sectional area as the leading vehicle, it does not displace air nor cause air to flow therein, so even when plural intermediate vehicles are connected to the vehicle formation, they do not contribute to the air flow surrounding the car body. Therefore, the air flow is determined by the amount of air being displaced by the leading vehicle. In other words, the air flow around the traveling vehicle caused by displacement of air at the nose portion of the leading vehicle and the flow of displaced air toward the rear vehicle can be exemplified as if the nose portion of the leading vehicle is outputting air and the rear portion of the rear vehicle is sucking in air.

According to another explanatory expression for describing the air flow, when the air flow around the vehicle is considered as air pressure, the nose portion of the traveling leading vehicle compresses air while displacing static air, so the pressure of the air near the front end of the nose portion is increased. On the contrary, at the tail of the rear vehicle, since the surrounding air attempts to move in to fill the space being expanded by the movement of the car body, the pressure around the tail of the rear vehicle drops. Therefore, the pressure at the nose portion of the leading vehicle increases and the pressure at the tail portion of the rear vehicle drops. In an atmospheric prediction regarding high-pressure and low pressure, the movement of the car body accompanies a high pressure at the nose portion of the leading vehicle and a low pressure at the tail portion of the rear vehicle.

When the vehicle formation moves at high speed in a tunnel, micropressure waves are generated by the interaction between the leading vehicle 1 and the tunnel 3. A high pressure accompanies the movement of the leading vehicle 1 at its nose portion, and when the leading vehicle enters a narrow tunnel 3, the high pressure is further compressed by the tunnel and the pressure increases. If the pressure increases greatly, weak soundwaves, or micropressure waves, are created. Thus, the micropressure waves are generated by the interaction between the leading vehicle 1 and the tunnel 3.

If the amount of air being displaced by the leading vehicle 1 traveling at high speed (strength of air-sink, or maximum of high pressure) is small, the micropressure waves are reduced. Since the speed of the vehicle corresponds to the distance it travels per unit time, the amount of air being displaced is proportional to the cross-sectional area and the running speed. Since the running speed is constant, it is possible to cut down the micropressure waves by reducing the cross-sectional area.

As mentioned earlier, it is not preferable to reduce the cross-sectional area of the car body since it causes reduction of the passenger capacity of the train. According to the present invention, a portion of the air displaced from the nose portion of the leading vehicle is sucked in through the air intake 6 for a predetermined time during entry to the tunnel, according to which the same effects can be achieved as reducing the cross-sectional area of the nose portion where the air intake is formed, and thus, the micropressure waves can be reduced.

Figure 4:
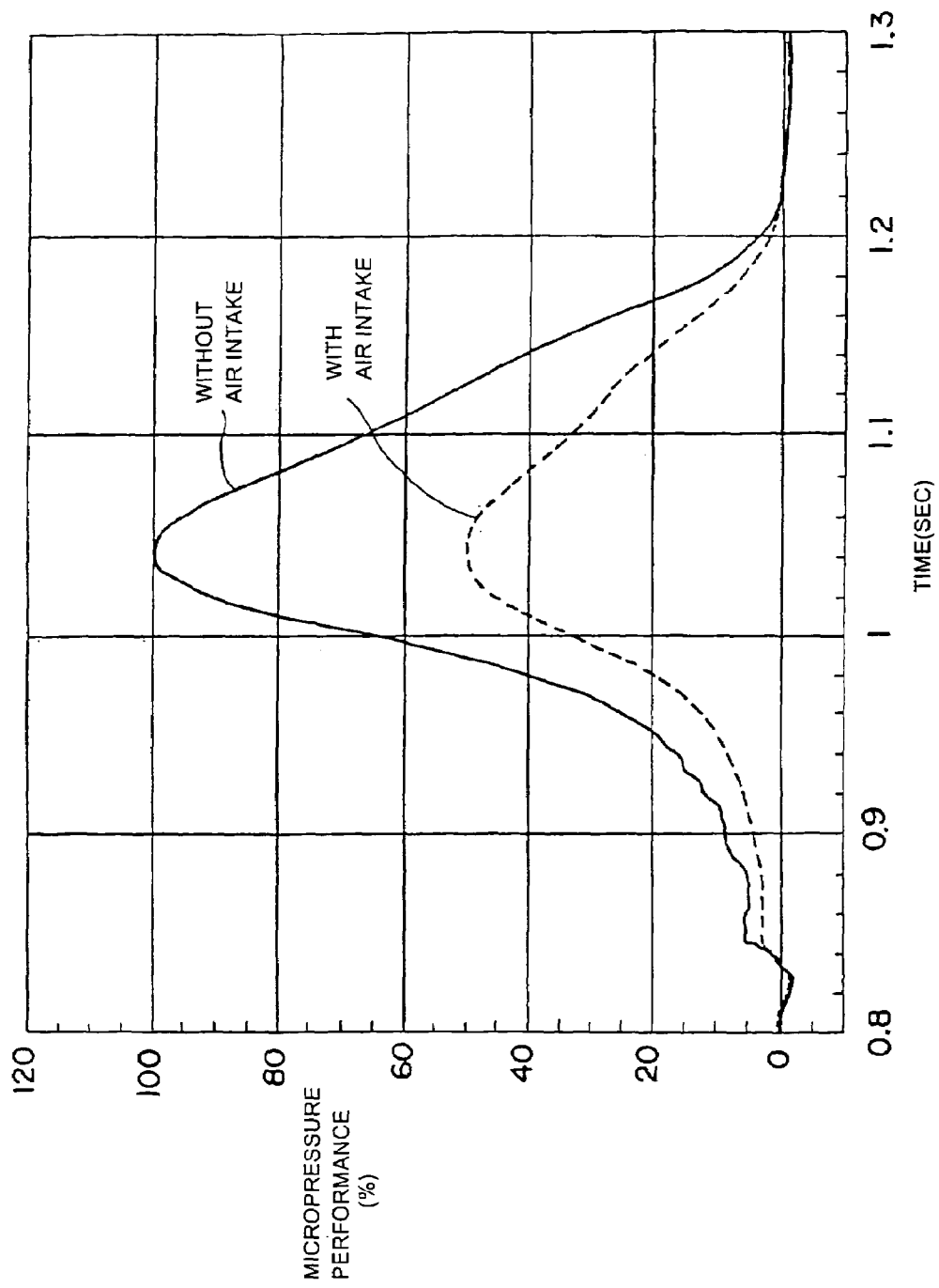
FIG. 4 is a graph showing the result of analysis of the micropressure waves in a tunnel.

FIG. 4 is a graph showing the analysis result of the micropressure waves (pressure gradient per unit time obtained by differentiating the pressure change in the tunnel with time) measured at a location inside the tunnel at a given distance from the entrance of the tunnel (for example, 60 m), when a vehicle formation having a leading vehicle with a nose shape that satisfies a determined condition (such as a spheroid) and a rear vehicle travels in the tunnel. Actually, there are tunnels having tunnel portal hoods disposed at its entrance and exit, and there are those that do not. FIG. 4 assumes that the tunnel has no hoods. The conditions in which micropressure waves are generated by the entry of the leading vehicle to the tunnel are considered, with the nose portion of the leading vehicle divided into three parts, a tip region, an intermediate region and a rear region. During entrance of the leading vehicle into the tunnel, the maximum micropressure waves are generated after the intermediate region of the three regions of the nose portion enters the tunnel. Generally, a driver's seat is formed in the intermediate portion, and the rate of change of the cross-sectional area is greater at the intermediate region than at the other regions. Therefore, the air being pushed by the intermediate region is blocked by the inner wall of the tunnel, and the pressure on the surface of the car body at the intermediate region increases rapidly. In other words, the air pressure at the surface of the nose portion of the leading vehicle moving at high speed is greatest at the tip region and reduces sequentially at the intermediate region and at the rear region in the named order, but since the cross-sectional area of the car body changes greatly with respect to the cross-sectional area of the tunnel at the intermediate region, the air at the surface of the car body is compressed at the intermediate region, and so the pressure at the surface of the car body at the intermediate region rises sharply. Thereby, the micropressure waves being generated are maximized. Therefore, if the suction of air at the surface of the car body is started at the tip and intermediate regions of the nose portion before the nose portion of the leading vehicle enters the tunnel, the car surface pressure at the tip and intermediate regions reduces before the entry of the nose portion to the tunnel, and thus, rapid pressure increase causing the generation of micropressure waves can be prevented. Further, by continuously sucking in the air from the surface of the car body until the rear region of the nose portion enters the tunnel, the generation of micropressure waves can be suppressed greatly compared to when no air is taken in. As described, by taking in air through the nose portion starting from a predetermined time before the entry of the tip region of the leading vehicle to the tunnel until the entry of the rear region of the nose portion to the tunnel, the generation of micropressure waves can be reduced effectively with a small amount of air intake.

According to the above-mentioned embodiment, the air near the surface of the car body at the nose portion is taken in and discharged via a pair of air inlets 6, air flow paths 7, intake control valves 8, air reservoirs 9, pumps 10 and air outlets being connected, but it is also possible to form the intake control valve 8 as a flow path switch valve for switching the flow path between two air flow paths, wherein an air flow path is formed that bypasses the air reservoir 9 and the pump 10 and connects to the air flow switch valve. According to some tracks, the vehicle formation may frequently enter and exit tunnels, so there may be no time to depressurize the air reservoir. In such a case, the flow path switch valve can be operated to communicate the air inlet directly with the air outlet, and to let the air flow toward the air outlet when the air pressure at the surface of the nose portion of the car body increases, by which the increase of micropressure waves can be suppressed.

Figure 5:
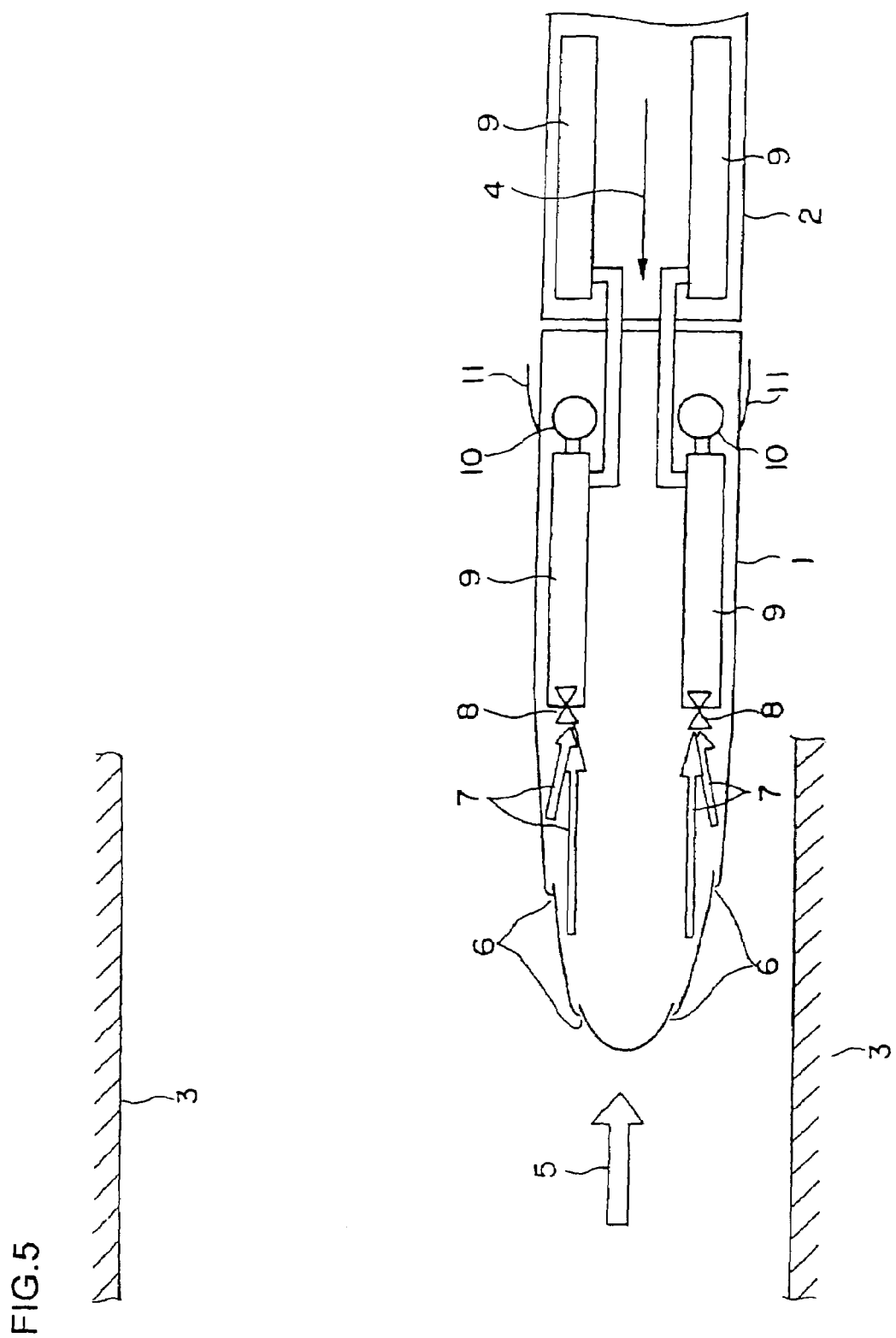
FIG. 5 is an explanatory view showing in horizontal cross-section embodiment 2 of a railway vehicle according to the present invention.

Embodiment 2:

FIG. 5 is an explanatory view showing in horizontal cross-section the car body according to embodiment 2 of the present invention. In embodiment 1, the air reservoirs (air intake tanks) are located in the leading vehicle 1, but there are cases where there may not be enough space for reservoirs in the leading vehicle 1 if the cross-sectional area of the nose portion of the leading vehicle 1 is reduced or if a space for forming the driver's seat must be reserved. In such a case, another set of air reservoirs (air intake tanks) 9 can be disposed on a intermediate vehicle 2 connected to the leading vehicle 1, that are directly communicated with the air reservoirs 9 on the leading vehicle 1. According to this arrangement, the amount of air intake can be increased, and the micropressure reduction performance can be enhanced.

Figure 6:
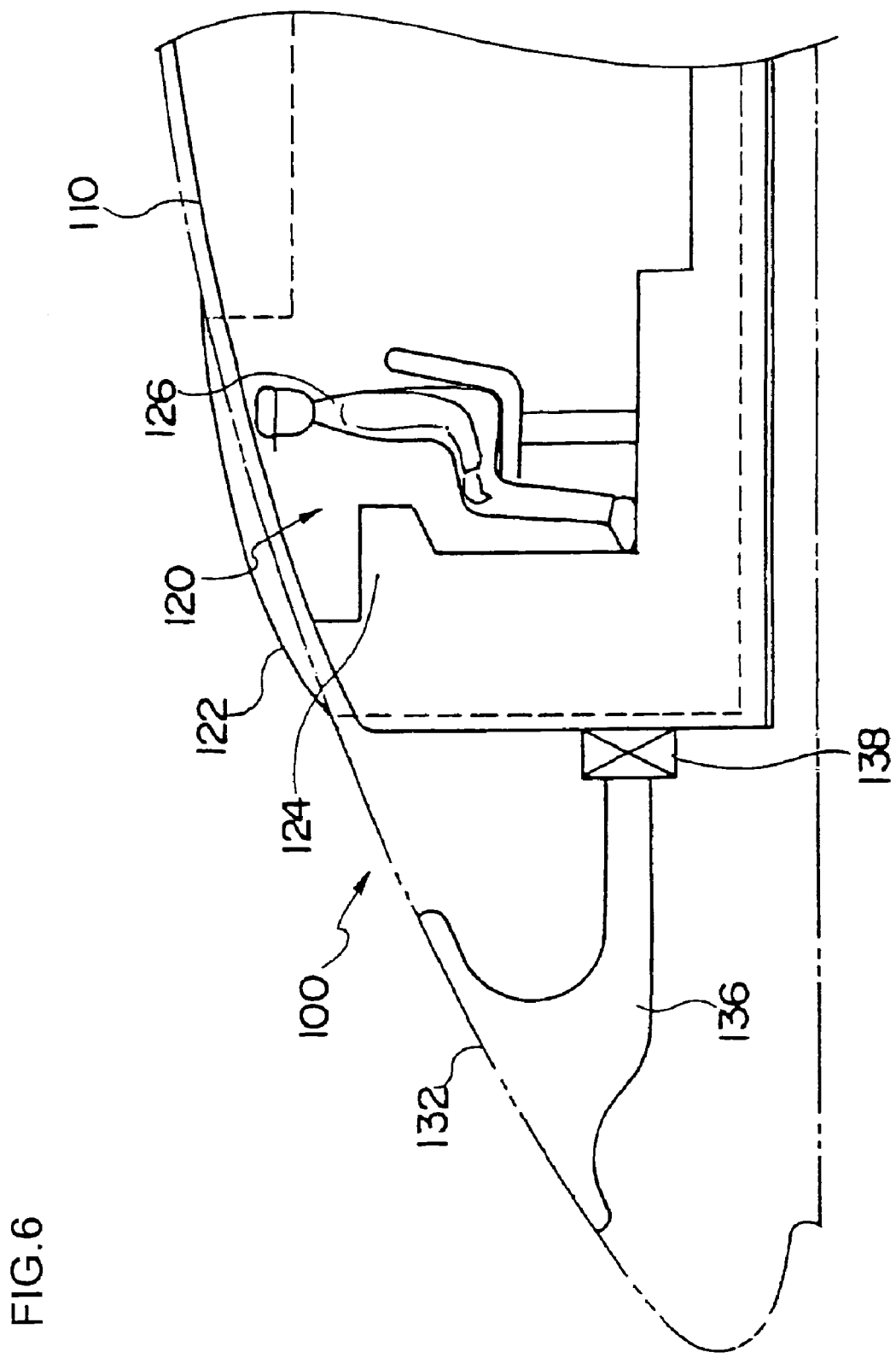
FIG. 6 is a side view of a nose portion of a leading vehicle.
Figure 7:
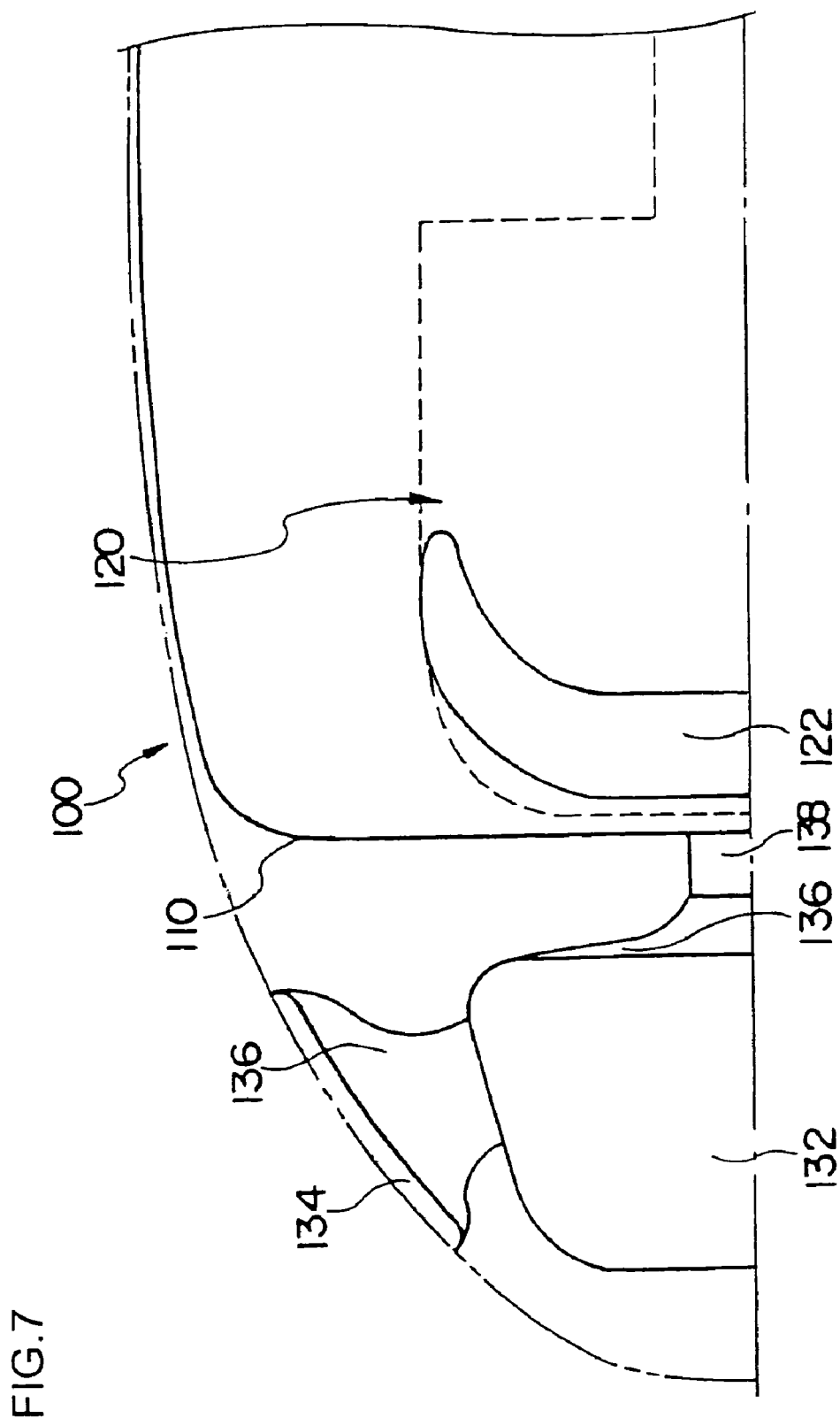
FIG. 7 is a plan view of FIG. 6.
Figure 8:
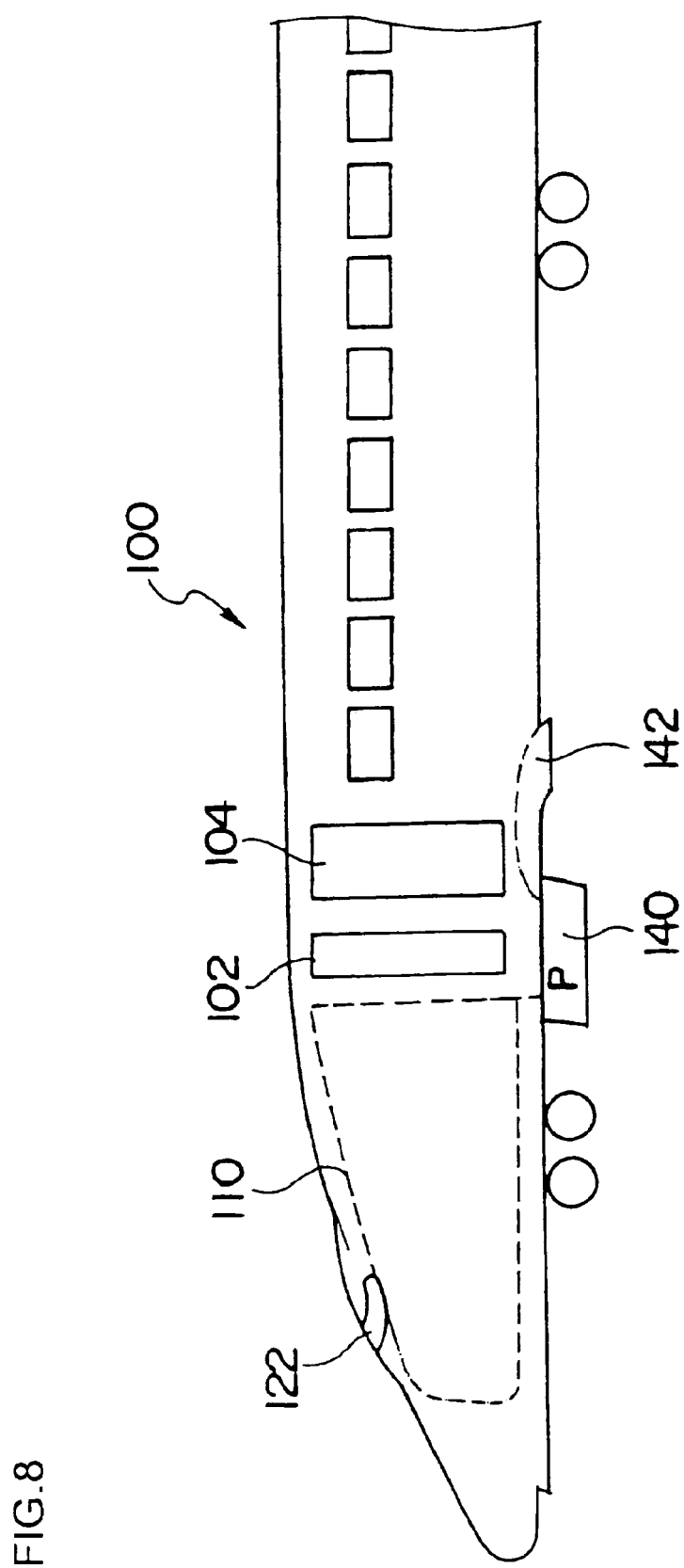
FIG. 8 is a side view of a leading vehicle.
Figure 9:
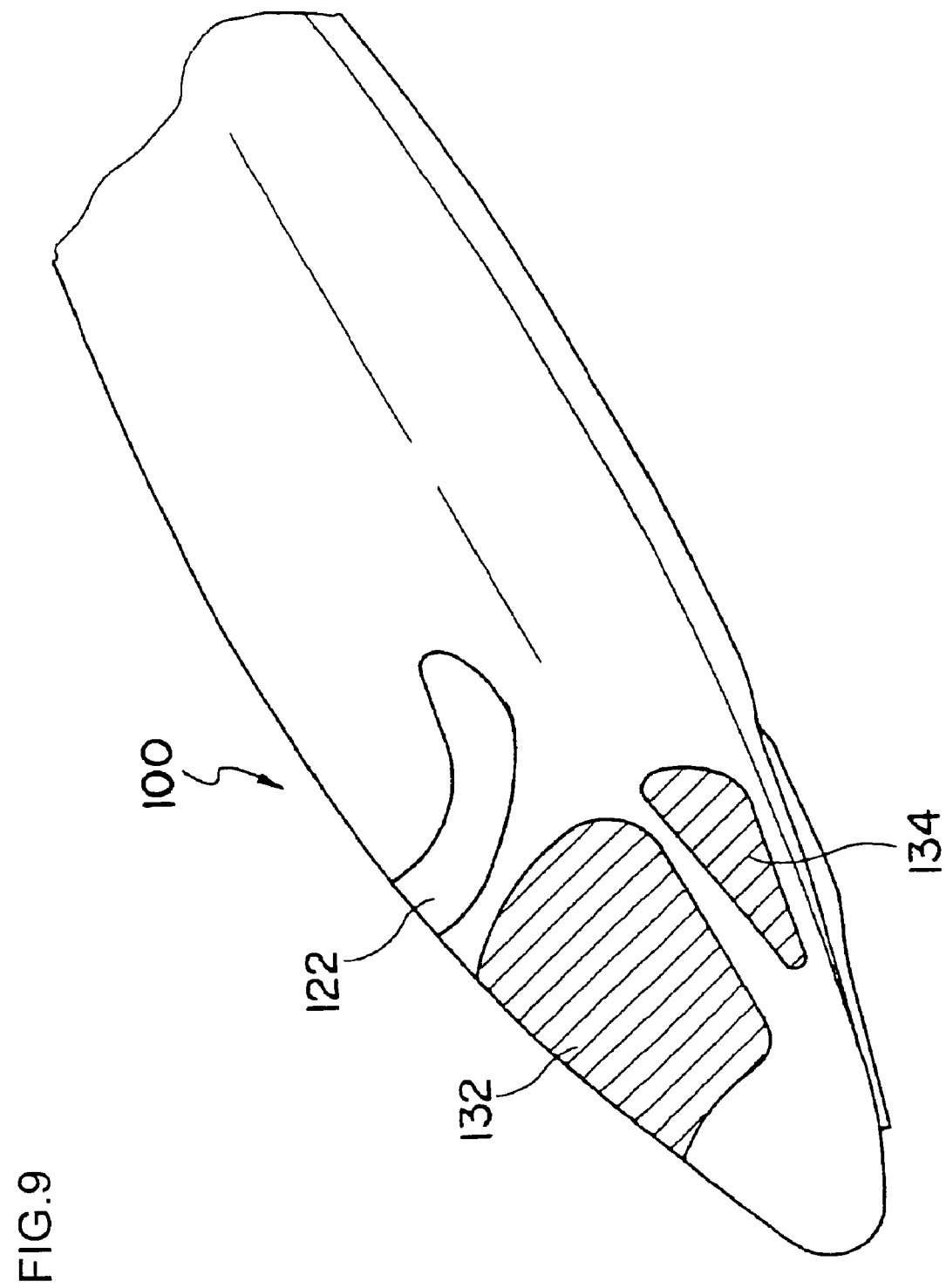
FIG. 9 is a birds-eye view of a nose portion of a leading vehicle.
Figure 10:
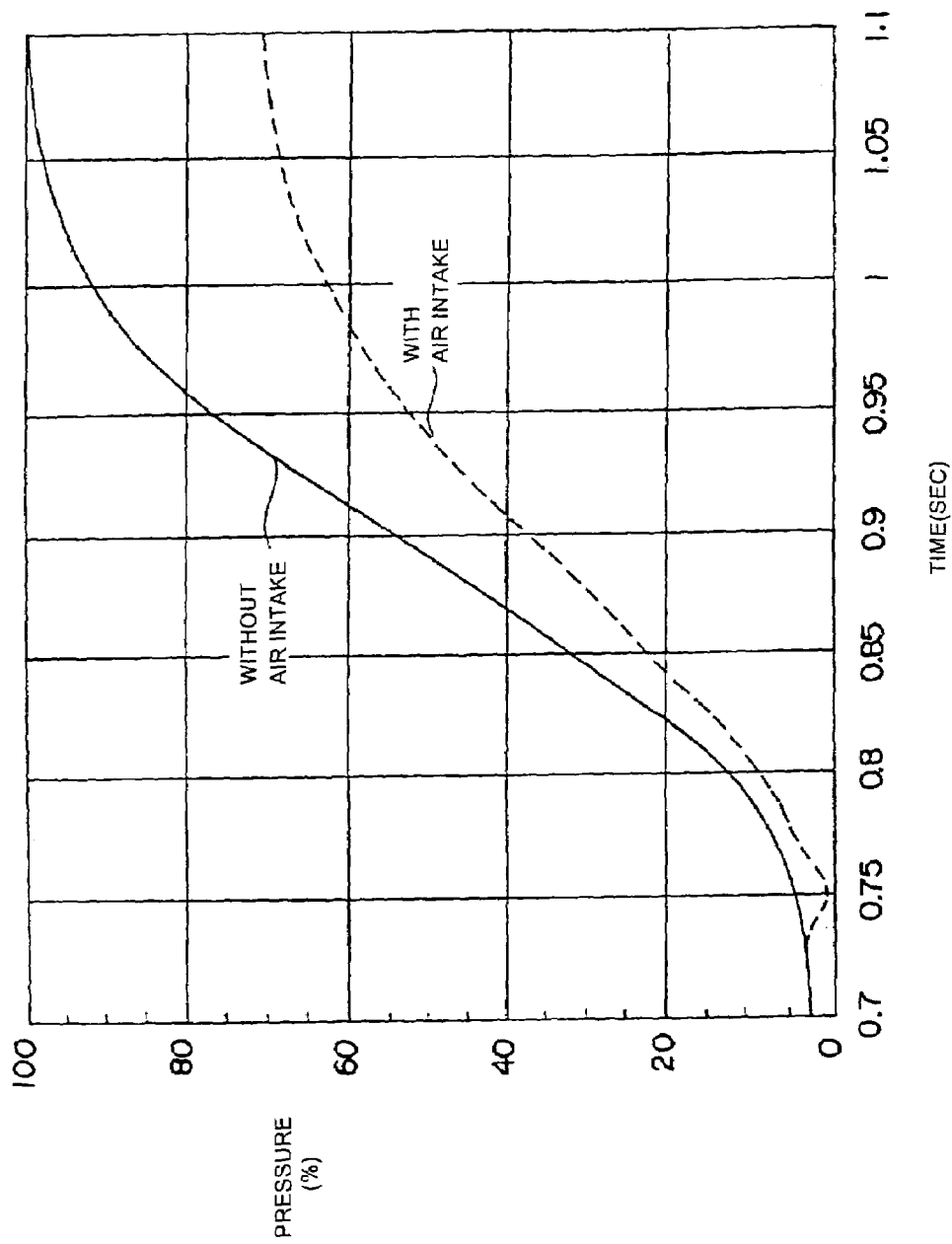
FIG. 10 is a graph showing the result of analysis of the pressure change in a tunnel.
Figure 11:
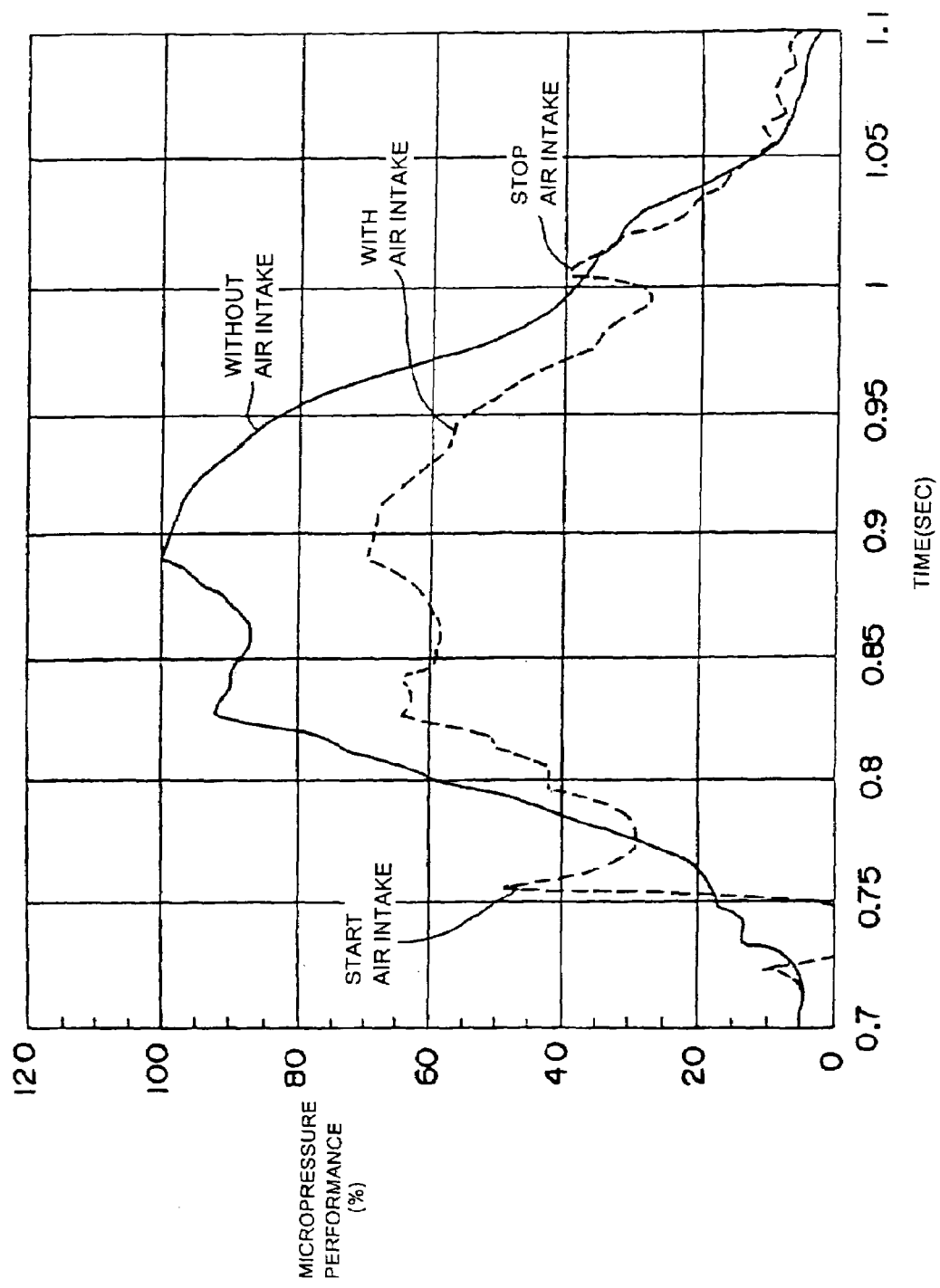
FIG. 11 is a graph showing the result of analysis of the micropressure waves in a tunnel.

Embodiment 3:

FIGS. 6 through 11 are referred to in describing another embodiment of a leading vehicle according to the present invention. FIG. 6 is a cross-sectional view of a nose portion of the leading vehicle, illustrating an air reservoir (air intake tank), a driver's cabin and an air inlet. FIG. 7 is a plan view of FIG. 6. FIG. 8 is a side view of the leading vehicle of the present embodiment, in which the nose portion is mainly illustrated. FIG. 9 is a birds-eye view of the nose portion of the leading vehicle. FIGS. 10 and 11 are graphs showing the result of analysis of the pressure change in the tunnel and the analyzed result of the micropressure waves when the leading vehicle enters the tunnel.

The leading vehicle 100 is equipped with an air reservoir (air intake tank) 110 and a driver's cabin 120 at the nose portion where the cross-sectional area is changed. The air reservoir 110 is disposed inside the cabin at the nose portion of the leading vehicle 100, and designed to have a capacity descried later. Normally, the nose portion of the leading vehicle has a driver's cabin 120 formed thereto, and equipments such as driving operation apparatuses, various control apparatuses and display devices indicating the status of operation are disposed in the driver's cabin. The driving operation apparatuses and display devices are disposed on the control platform 124. The control apparatuses are disposed behind the control platform 124 of the driver's cabin. The driver's cab in 120 has a window 122, enabling the driver 126 to observe the frontward area of the vehicle. The air reservoir 110 occupies a portion of the nose portion of the leading vehicle 100, designed to start from a position closest to the tip of the nose portion as possible and extending toward the cabin. The capacity of the air reservoir is determined so that it can take in through the nose portion the amount of air required to reduce the micropressure waves. As illustrated in FIG. 7, the air reservoir 110 is formed to the interior of the car body and designed to have its exterior disposed close to the interior surface of the car body, with the driver's cabin 120 disposed within the air reservoir 110. A partition board separates the air reservoir 110 and the driver's cabin 120. The width of the air reservoir 110 is greater than the width of the driver's cabin 120, so the air reservoir 110 can be formed efficiently in the interior of the car body. In other words, the driver's cabin 120 is formed within the air reservoir 110.

Air intake ports 132 and 134 serving as air inlets are formed on the leading vehicle 100, which are illustrated by hatchings in FIG. 9. The air intake port 132 is formed on the upper face of the nose portion, and the air intake ports 134 are formed on the side faces of the nose portion. The air intake ports 132 and 134 should preferably be formed to the area having the greatest influence on the generation of micropressure waves, that is, to the intermediate region of the three equally divided regions of the nose portion, for maximum effects. Moreover, it is effective to form the area of the air intake ports 132 and 134 to correspond to approximately 10 to 20% of the projected area of the front of the car body (the maximum cross-sectional area of the car body).

A duct 136 serving as an air flow path is connected to the air intake ports 132, 134, and the duct 136 is connected to an intake control valve (air intake valve) 138. The intake control valve 138 is connected to the air reservoir 110 either directly or via a duct (according to the example illustrated in FIGS. 6 and 7, the intake control valve 138 is directly connected to the air reservoir 110).

Grilles are disposed to the air intake ports 132, 134 to prevent intake of foreign matter. Further, rain water may enter the duct 136 or the air reservoir 110. The present embodiment is equipped with a mechanism to discharge the rain water entering the duct 136 while closing the intake control valve 138. Further, the rain water entering the air reservoir 110 can be discharged by a pump 140.

A pump 140 is connected to the air reservoir 110 for discharging the air inside the reservoir. A discharge duct 142 is disposed on the pump 140. The air outlet of the discharge duct 142 is formed on the under floor portion at a location rearward from the nose portion of the leading vehicle in the direction of travel, and designed so that air is discharged toward the tracks. While the intake control valve 138 is closed, the air inside the air reservoir 110 is discharged to the outside of the car body via the pump 140.

As shown in FIG. 7, the air reservoir 110 is designed so that its width corresponding to the width direction of the car body is as long as possible so as to ensure sufficient inner volume. Therefore, as shown in FIG. 8, the length of the reservoir in the longitudinal direction of the car body is shortened so as to minimize the reduction of passenger cabin space. A driver's cabin entrance platform 102 that is connected to the driver's cabin 120 and the passenger cabin entrance platform 104 that is connected to the passenger cabin is positioned closer to the center of the car body than the air reservoir 110. The air reservoir 110 has sufficient strength to endure the difference in pressure between the interior of the air reservoir and the exterior of the running vehicle. Further, since the driver's cabin 120 is formed inside the air reservoir 110, the outer circumference is formed to have a strength similar to that of the air reservoir 110.

One example of the capacity of the air reservoir 110 is described. When the vehicle speed is 350 km/h, the maximum cross-sectional area of the car body is 11 m$^2$, the length of the nose portion of the leading vehicle is 15 m, and the cross-sectional area of the tunnel is 63 m$^2$ (the tunnel has an entrance hood with a length of 10 m and a cross-sectional area of 88 m$^2$ at the entrance thereof), the air reservoir 110 must have a capacity of around 30 m$^3$. The capacity of the air reservoir 110 varies according to the speed at which the leading vehicle enters the tunnel, the nose shape, whether the tunnel has a hood or not, or the conditions of the surface of the track (for example, whether it is a slab track or a ballast track).

Next, we will describe the conditions in which the leading vehicle 100 enters the tunnel at the above-mentioned speed. FIG. 10 shows the status of the pressure measured at a location substantially 60 m into the tunnel from the entrance. FIG. 11 shows the analyzed result of the micropressure waves, wherein the pressure gradient per unit time is computed by differentiating the pressure change in the tunnel with time. The continuous lines in FIGS. 10 and 11 show the status of the leading vehicle in which air intake is not performed at the nose portion, and the dotted lines show the status in which air is taken in through the nose of the leading vehicle. In this example, the nose shapes of the leading vehicles for the two cases, one where air intake is not performed and one where air intake is performed, are substantially the same.

According to the leading vehicle in which air intake is performed, if the air inside the air reservoir 110 is discharged in advance via the pump 140, the intake control valve 138 is opened to start air intake at around 10 m before the entrance of the tunnel hood on the entrance of the tunnel, and after taking in air for a predetermined time or around 0.25 seconds, the intake control valve 138 is closed and air intake is stopped. That is, the air intake is stopped when the whole leading vehicle body has entered the tunnel.

According to another example, the operation of the pump 140 is started before the entry of the leading vehicle into the tunnel at such timing so that the leading vehicle reaches 10 m before of the tunnel hood after the inner pressure of the pressure of the air reservoir 110 has been reduced to a pressure enabling air intake. When the leading vehicle has reached 10 m before the tunnel hood, the intake control valve 138 is opened and air intake is started, and after taking in air for a predetermined time or around 0.25 seconds, the intake control valve 138 is closed and air intake is stopped. At this time, the operation of the pump 140 can be either stopped or continued. Then, after a second predetermined time has passed (a very short time, which can be omitted), the pump 140 is operated and the air in the air reservoir 110 is discharged gradually. The air is discharged gradually so as not to cause increase of air pressure at the exterior of the car body.

As described, by taking in air through the leading vehicle, the increase of pressure can be suppressed by approximately 30% at the leading vehicle taking in air when the pressure change of the leading vehicle that does not take in air is set to 100%, as shown in FIG. 10. Furthermore, the change in the pressure gradient, which has the greatest influence on the generation of micropressure waves, can be reduced as shown in FIG. 11, so that the micropressure waves can be reduced by around 30% at the leading vehicle taking in air when the micropressure waves caused by the leading vehicle that does not take in air is set to 100%.

In some railway tracks, plural tunnels are formed sequentially. In such a case, the railway vehicle enters one tunnel and exits the tunnel, and only after a few moments, enters the next tunnel. When the railway vehicle is running through sequential tunnels, the pump 140 should be operated continuously so as to continue discharging air from the air reservoir 110. When the vehicle is passing through the first tunnel, the pump 140 is operated to reduce the pressure in the air reservoir 110 to negative pressure, so as to enable air to be taken in when the vehicle enters the next tunnel.

When the leading vehicle enters a tunnel, the intake of air is started just before entering the tunnel. The air inside the air reservoir 110 is discharged in advance via the pump 140, and the air intake is started by opening the intake control valve 138 just before the leading vehicle enters either the tunnel or, if any, the tunnel hood.

In the case of a shinkansen train where the operation of the vehicles is controlled by an automatic train control (ATC) system, the signal indicating the current position of the train is taken in from the ATC, and based on this positional signal, the intake control valve 8 or 138 and the pump 10 or 140 are controlled via the control unit equipped to the vehicle. In other words, based on the positional signal directly before the entry of the vehicle to the tunnel, the intake control valve 138 is opened, the pump 140 is operated so as to take in air, and thereafter, the control for discharging air is executed. In another example, it is possible to place a signal output means to the tracks, and to control the operation of the apparatuses on the vehicle based on the control signals from the signal output means.

When the vehicle formation including the leading vehicle 100 is running on a track with a tunnel at a speed of 350 km/h, for example, and is just about to enter a tunnel, the air pushed and displaced by the nose of the leading vehicle 100 is blocked by the entrance portion of the tunnel or the hood formed to the entrance of the tunnel, causing high pressure to generate at especially the intermediate region of the nose portion. However, by taking in air via the air intake ports 132, 134 formed on the surface of the car body at the nose portion of the leading vehicle 100, the pressure increase at the nose portion can be suppressed. Thus, even if the nose portion of the leading vehicle 100 enters a tunnel or a tunnel hood at a speed that has conventionally caused micropressure waves, according to the present invention, the rapid pressure increase in the tunnel can be suppressed, and the generation of micropressure waves can thereby be suppressed.

In the leading vehicle 100, the capacity of the air reservoir 110 can be changed according to the shape and length of the nose portion, and the timing of air intake can be changed according to the vehicle speed, the shape of the tunnel entrance or the existence of an entrance hood, so as to reduce the micropressure waves effectively. Moreover, as long as the capacity of the air reservoir 110 is sufficient in order to reduce the micropressure waves while taking into account the nose shape, the conditions of the tunnel and the vehicle speed for entering the tunnel, the nose shape of the leading vehicle 100 can be designed relatively liberally.

Since the air reservoir is disposed at the nose portion of the leading vehicle 100, there is fear that the passenger cabin capacity of the leading vehicle may be reduced. However, in order to run the vehicle at higher speed in a conventional tunnel and to suppress the generation of micropressure waves, there has been no other choice but to reduce the cross-sectional area of the car body. The reduction of cross-sectional area of the car body causes the capacity of the passenger cabin in the vehicle formation to be cut down severely. However, according to the present leading vehicle 100, even if a portion of the passenger cabin is occupied to form the air reservoir 110, the reduction of capacity of the passenger cabin is little in consideration of the whole vehicle formation. Therefore, by disposing an air reservoir 110 to the leading vehicle 100, the reduction of passenger cabin capacity of the whole vehicle formation can be suppressed.

Until now, a hood was provided to the entrance of the tunnel to reduce the low-frequency sound caused by the micropressure waves generated by the high-speed vehicle. However, since the leading vehicle itself is equipped with a mechanism to reduce the micropressure waves, the present invention enables to suppress the low-frequency sound caused by micropressure waves without having to depend on tunnel entrance hoods. Moreover, along with the increase in the speed of railway vehicles on some tracks, countermeasures to suppress micropressure waves had to be taken, such as to elongate the length of the entrance hoods, but according to the leading vehicle of the present invention, there is no need to modify the entrance hoods even if the vehicle speed is increased.

According to the present invention, if a tunnel is equipped with an entrance hood, the hood is considered as a part of the tunnel.

The present invention is intended to be applied to high-speed vehicles running in tunnels. However, the present invention can be applied to other cases, such as to a large freight car entering a tunnel in a highway, or to a subway train that travels at low speed but causes generation of micropressure waves due to similar conditions as the high-speed train.

What is claimed is:

1. A railway vehicle comprising:
   an air inlet for taking in air disposed on a surface of a car body at a nose portion of a leading vehicle;
   an air outlet for discharging the air being taken in disposed rearward from said nose portion in a direction of travel; and
   an air intake tank separated from a passenger cabin and communicating said air inlet and said air outlet; and
   an automatic train control for controlling said air intake tank to take in air through said air inlet and store the same when said leading vehicle enters a tunnel, and to control discharging of the air through said air outlet when a predetermined time has passed, wherein said automatic train control system is configured to regulate air in said air intake tank in coordination with the position of the vehicle relative to the tunnel.

2. The railway vehicle according to claim 1, further comprising a pump disposed between said air intake tank and said air outlet.

3. The railway vehicle according to claim 2, wherein said pump takes in air through said air inlet to said air intake tank, and discharges the air from said air intake tank.

4. The railway vehicle according to claim 1, wherein said air inlet is formed on the surface of the car body at an intermediate portion of the nose portion of the car body.

5. The railway vehicle according to claim 4, wherein an air intake area of said air inlet is substantially 10 to 20% of a maximum cross-sectional area of the car body of the railway vehicle.

6. The railway vehicle according to claim 1, wherein the air outlet is disposed on an underside of the car body.

7. A railway vehicle comprising:
an air inlet for taking in air disposed on a surface of a car body at a nose portion of a leading vehicle;
an air outlet for discharging the air being taken in disposed rearward from said nose portion in a direction of travel; and
an air intake tank mounted relative to the car body and communicating said air inlet and said air outlet;
a pump disposed between said air intake tank and said air outlet;
an air intake valve disposed on an air inlet side of said air intake tank, wherein said air intake valve is configured with an open position to allow air into said air intake tank and a closed position to prevent air from entering said air intake tank, and wherein said pump is located on an air outlet side of said air intake tank.

8. The railway vehicle according to claim 7, further comprising an automatic train control for controlling said air intake valve to open when the leading vehicle enters a tunnel and to close when a predetermined time has passed, and to control said pump to start to operate after the vehicle enters the tunnel so as to discharge the air from said air intake tank.

9. The railway vehicle according to claim 7, further comprising an automatic train control for controlling said pump during discharging of air from said air intake tank so that said pump stops operating when the pressure in said air intake tank is reduced to negative pressure.

10. The railway vehicle comprising:
an air inlet for taking in air disposed on a surface of a car body at a nose portion of a leading vehicle;
an air outlet for discharging the air being taken in disposed rearward from said nose portion in a direction of travel; and
an air intake tank separated from a passenger cabin and communicating said air inlet and said air outlet; and
an automatic train control for controlling said air intake tank to start to take in air through said air inlet before said leading vehicle enters a tunnel, and to terminate air intake through said air inlet when the nose portion of said leading vehicle completes entering the tunnel.

11. A method for operating a vehicle whose operation is controlled via an automatic train control system: and which comprises a mechanism for taking in and discharging air, the method comprising:
when the vehicle passes through a tunnel, controlling said mechanism by the automatic train control system to take in air when said vehicle enters the tunnel; and
after a predetermined time has passed, controlling said mechanism by the automatic train control system to discharge the taken-in air; wherein said automatic train control system is configured to operate said mechanism in coordination with the position of the vehicle relative to the tunnel.

12. The method according to claim 11, further comprising storing the air taken-in in an air intake tank prior to discharging the taken-in air.

13. The method according to claim 11, wherein the automatic train control system controls said mechanism to start to take in air before the vehicle enters a tunnel, and to terminate air intake when a nose portion of the vehicle completes entering the tunnel.

14. The method according to claim 12, wherein the automatic train control system controls said mechanism to start to take in air when the vehicle enters the tunnel and to stop taking in air after a predetermined time has passed, and to start operating a pump after the vehicle enters the tunnel so as to discharge the taken-in air from the air intake tank.

15. The method according to claim 14, wherein the automatic train control system controls the pump to stop operating when the pressure in the air intake tank is reduced to a negative pressure.

* * * * *